United States Patent [19]

Sollerud

[11] 3,782,270

[45] Jan. 1, 1974

[54] APPARATUS FOR MAKING FOOD UNITS

[75] Inventor: Soren Elof Mauritz Sollerud, Norrkoping, Sweden

[73] Assignee: Maskin AB Solco, Norrkoping, Sweden

[22] Filed: Nov. 1, 1971

[21] Appl. No.: 194,470

[30] Foreign Application Priority Data
Nov. 2, 1970  Sweden............................ 14744/70

[52] U.S. Cl................ 99/450.4, 99/450.7, 425/109, 425/444
[51] Int. Cl............................................ A21c 15/02
[58] Field of Search...................... 99/450.2, 450.4, 99/450.5, 450.6, 450.7, 450.3; 425/395, 444, 111, 116, 123, 109, 127, 129

[56] References Cited
UNITED STATES PATENTS
3,083,651  4/1963  Cooper .......................... 425/395 X
3,095,832  7/1963  Evans............................... 99/450.6
3,182,611  5/1965  Rubenstein ...................... 99/450.4

Primary Examiner—Harvey C. Hornsby
Assistant Examiner—Alan I. Cantor
Attorney—Beveridge & DeGrandi

[57] ABSTRACT

Food units consisting of two slices of bread and a filling interleaved with them are prepared by slicing fresh bread and conveying the slices to means in which the desired filling is placed on one slice, whereupon another slice is placed on top of the filling on the first slice. The conveying means includes successive pairs of frames each accomodating one slice of bread, and one frame in each pair of frames is approximately horizontally oriented while the other frame is pivotally connected to the first frame and adapted to be raised ahead of the filling means to permit the filling to be spread over the horizontal slice, leaving adjacent the edges thereof a zone free of filling, whereafter the frames are swung together and pressure is exerted against the marginal zones of the slices to bond them together with the aid of their starch content.

The food units are made ready for consumption by being heated for a short time in a conventional toaster.

7 Claims, 5 Drawing Figures

APPARATUS FOR MAKING FOOD UNITS

This invention relates to an apparatus of making a food unit consisting of two superimposed slices of fresh bread and a filling interleaved with them.

The present invention has for its object to make it possible to prepare a food unit which consists of bread and a filling and which directly after it has been removed from a referigerator or freezer can be made ready for consumption by anyone in a very short time, preferably with the aid of a conventional toaster. The object of the invention is attained in that a zone is left free from filling adjacent the edges of the bread slices and that the slices are subjected to pressure in this zone along their edges mainly at right angles to the plane of the slices to realize peripheral bonding of the slices with the aid of their starch content. A food unit prepared in this way is simple to package for hygienic manipulation and is equal advantageous in homes and in snack bars and like facilities since any stickiness resulting from filling, such as butter and jam, is eliminated.

The invention also relates to an apparatus for making this food unit at a competitive price. This apparatus comprises means for slicing fresh bread and conveying means for conveying the slices from the slicing means to means in which a filling is placed on one slice while the other slice is placed on top of the first slice. Characteristic of this apparatus is that the conveying means includes successive pairs of frame means which are approximately of the same dimension as the slices and adapted each to accommodate one slice of bread, one frame in each pair of such frames being approximately horizontally oriented while the other frame is pivotally connected to the first frame and takes a sufficiently raised position on passing the filling means to permit a filling to be spread over the horizontal slice of bread while leaving adjacent its edges a zone free of such filling, and which frame means are adapted to be swung together after they have passed the filling means, and means are provided to exert pressure against the marginal zones of the slices of bread in said frames.

One embodiment of the invention will be more fully described hereinbelow with reference to the accompanying drawings in which:

FIG. 1 is a perspective view showing the general method of making the food unit according to the invention by means of a suitable apparatus;

FIG. 2 likewise is a perspective view showing means for applying a filling to a slice of bread;

Figure 1:
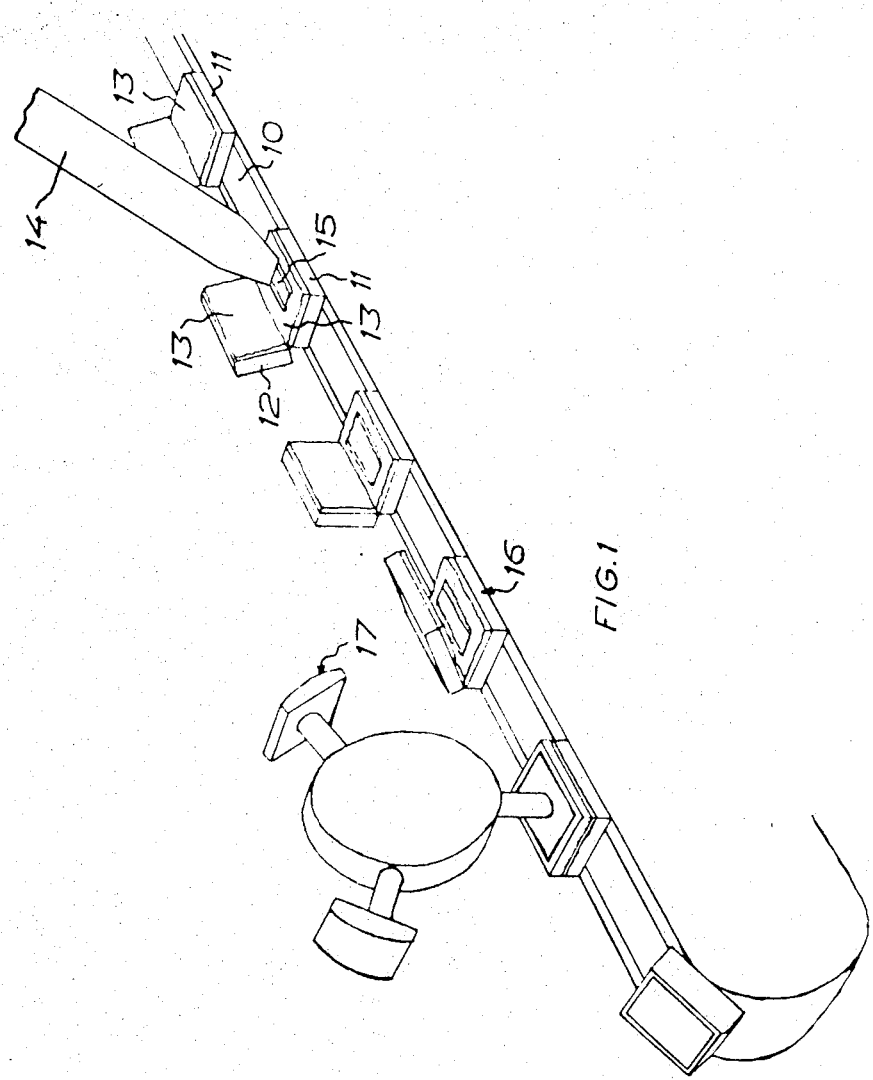

The principle of the invention resides in the features of placing between two slices of bread a filling and then so compressing the slices along their edges that they will be bonded together by the action of their starch content, resulting in a "pack" which can be handled in a simple and non-sticky manner. To this end, use is made of the apparatus generally illustrated in FIG. 1. First frame means 11 are fastened at uniform intervals to a conveyor belt 10, and second frame means 12 are pivotally connected to the first frame means 11. A bread slicing machine (not shown) slices fresh white bread into slices 13. Such a slice 13 is placed mechanically or manually in the frame 11 and another slice of bread 13 in the frame 12. The frames are designed to fit around and engage the peripheral edges of the bread slices and can, if needed, have fastening means for the slices of bread, such as projecting pegs, suction or like means. After the slices of bread have been placed each in a frame in the manner shown to the far right in FIG. 1 they are moved beneath means 14 for placing a filling 15 on the slice of bread 13 in the horizontal frame 11. The filling is not spread over the entire slice of bread but a zone is left free from filling adjacent the edges of the slice of bread, as will readily be seen from the drawing. Having passed the means 14, the frames 11 and 12 are brought together as shown at 16 and moved beneath pressing means generally designated 17. As will be described in more detail in the following, the pressing means 17 has press plates which project through the open upper frame 12 to exert pressure on the superimposed slices of bread 13 along their edges to bond said slices together with the aid of their own starch content. The press plate is then removed and the frame assembly proceeds along the conveyor 10 for ejection of the bonded slices of bread.

Figure 2:
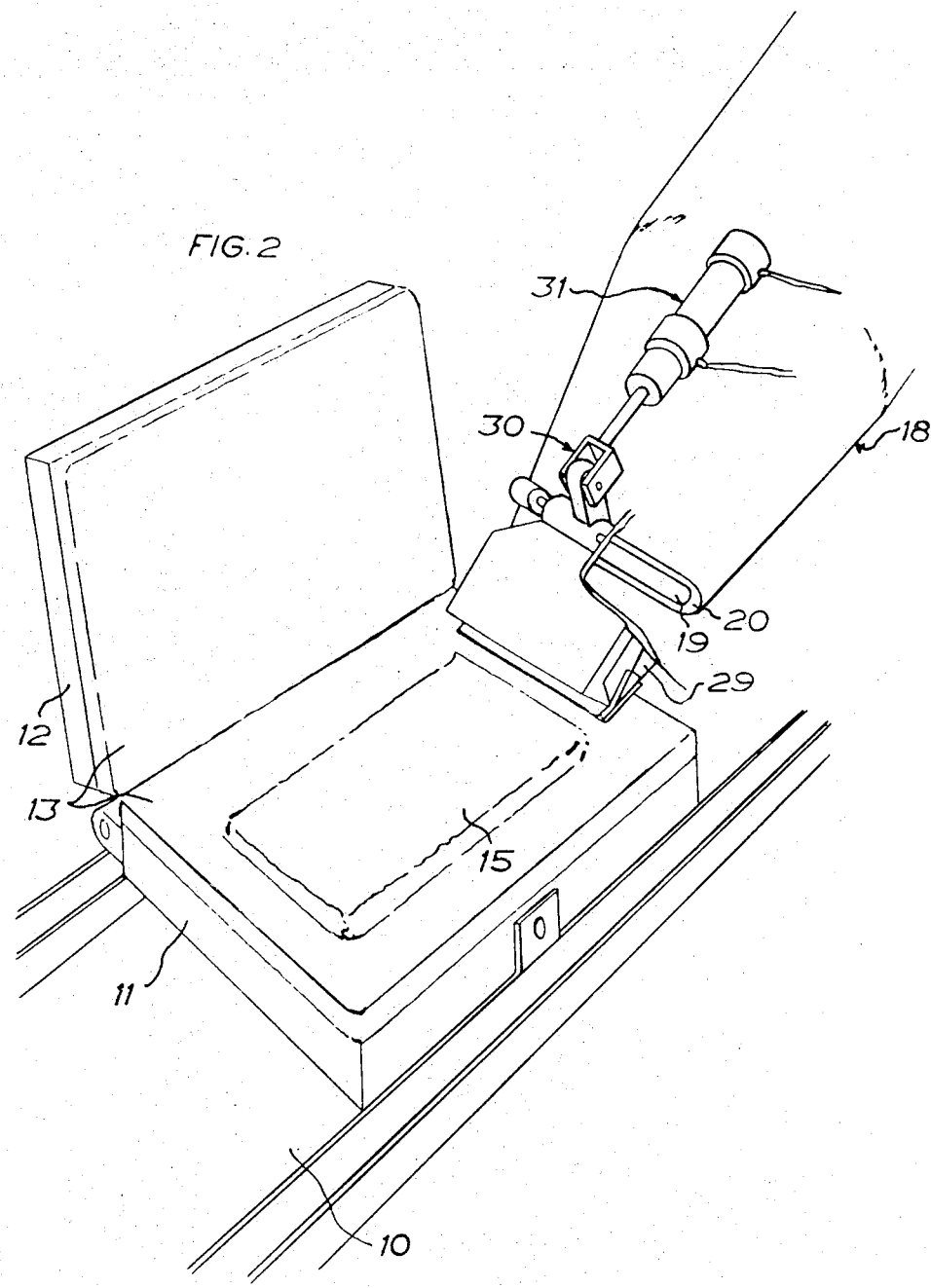
Figure 3:
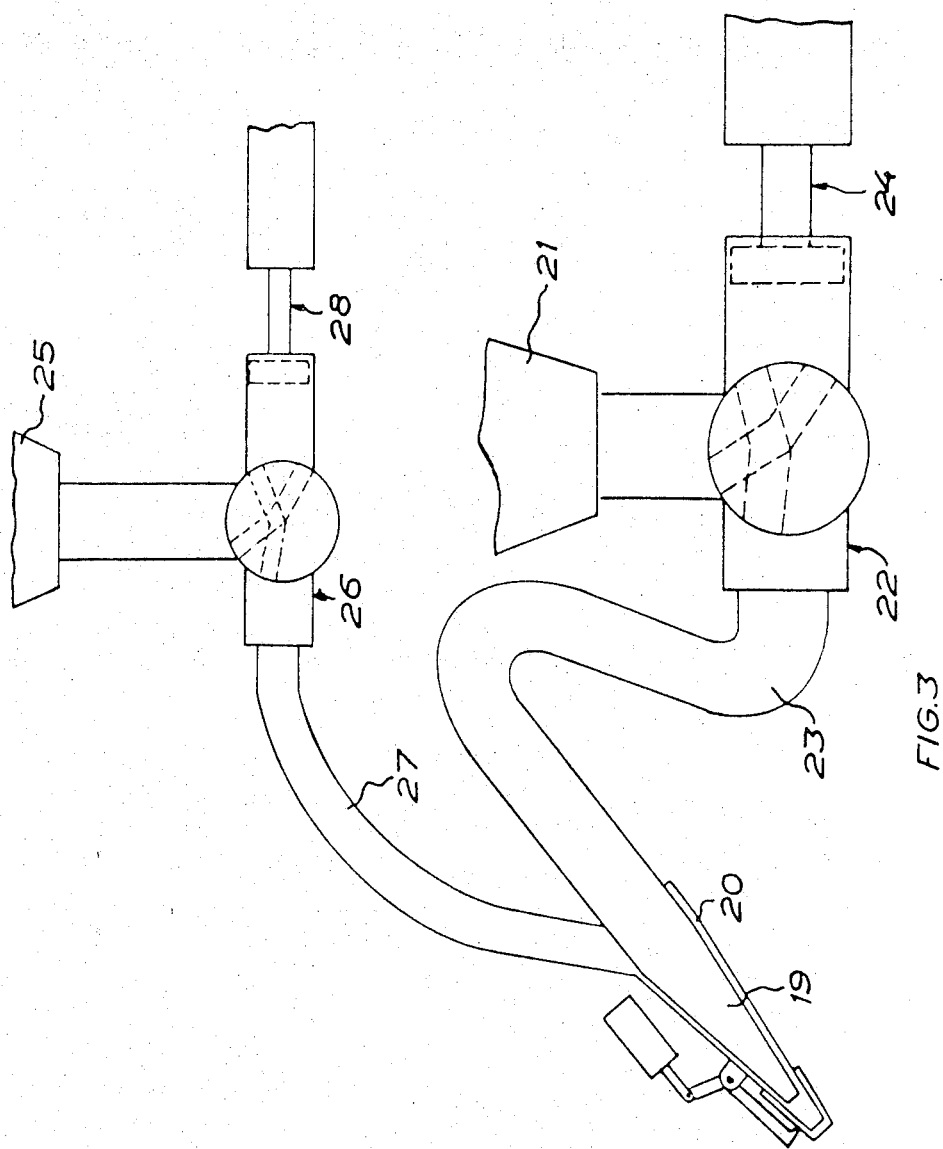
FIG. 3 is an elevation showing feed means connected to the nozzle shown in FIG. 2.

In its simplest embodiment the means 14 for supplying the filling is a flat nozzle through which a suitable amount of filling is supplied to each slice of bread 13. The nozzle is of such a width that a sufficient zone free from filling is obtained along the longitudinal side edges of the slice of bread, and the height of the nozzle is dependent upon the desired amount of filling. A specific nozzle 18 is shown in FIG. 2. It comprises an inner nozzle 19 and an outer nozzle 20. As will appear from the drawing, the outer nozzle 20 concentrically encloses the inner flat nozzle 19. The reason for this is that it shall be possible to extrude two different types of fillings at one and the same time, one filling enclosing the other one. This is desirable particularly if the filling consists of jam and butter, in which case the jam is extruded through the inner nozzle 19 and the butter through the annular outer nozzle 20. This will prevent the jam from coming into contact with the bread, which is not desirable because of the property of the jam of "wetting" through the slices of bread. The arrangement may be that diagrammatically shown in FIG. 3, in which a supply of jam 21 is connected to valve means 22 which in turn is connected with the inner nozzle 19 through a conduit 23. For the conveyance of jam from the supply 21 to the nozzle 19 with the aid of the valve means 22 there is arranged a piston and cylinder unit 24. In a corresponding manner butter is conveyed from a supply 25 via a valve 26 and a conduit 27 to the annular nozzle 20 by means of a piston and cylinder unit 28. By simultaneous actuation of the piston and cylinder units 24 and 28 and requisite operation of the valves 22 and 26 butter and jam may, if desired, be extruded in desired quantity from the nozzles 19 and 20. Disposed ahead of the nozzles 19 and 20 are a pair of jaws 29 which are operated over a suitable transmission 30 by a piston and cylinder unit 31 to cut or squeeze off exact lengths of the strand of butter and jam enclosed therein, which emerges from the nozzles 19 and 20. This will also provide the advantage that the two ends of the strand of butter are squeezed shut about the jam so that the latter is encapsulated at the ends of the cut-off length. When a filling, such as a filling of shrimps, is to be disposed between the slices of bread 13, which does not require any encapsulating in butter or like substance, use is naturally made of the inner nozzle 19 only. It will be realized that all foodstuffs of course are worked so as to obtain an extrudable consistency before their arrival at the nozzles 19 and 20.

Figure 4:
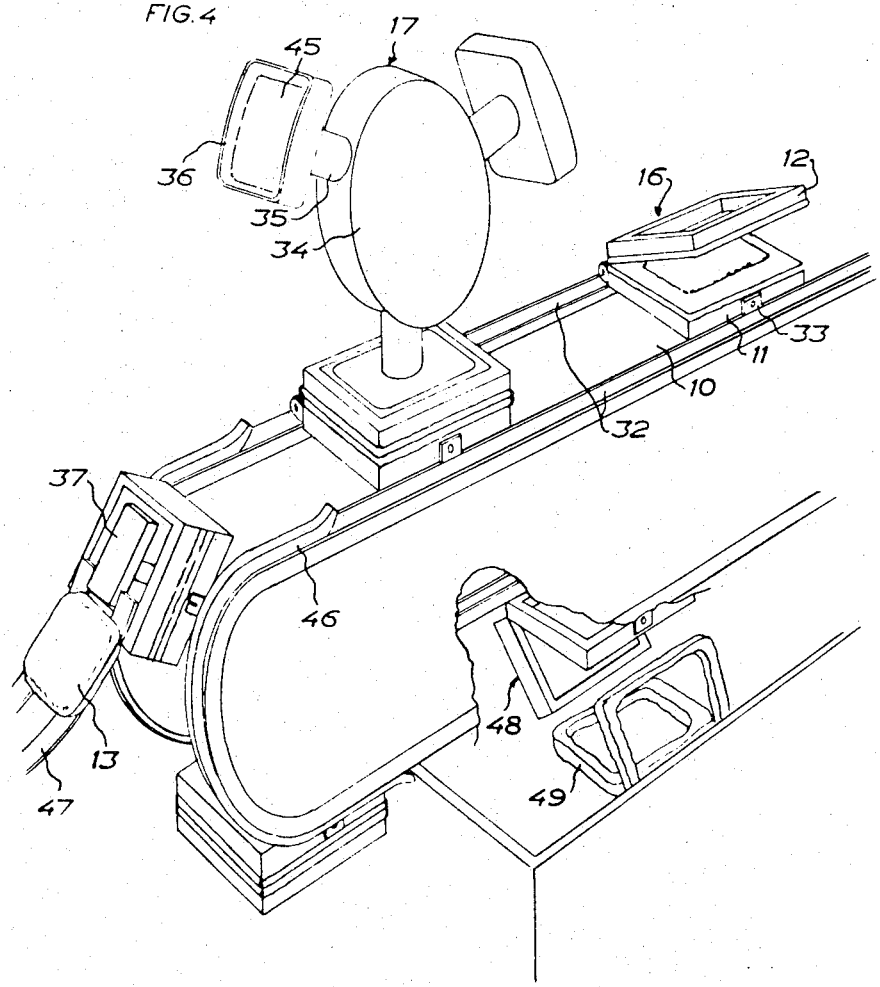
FIG. 4 is a detailed perspective view of means for pressing and ejecting slices of bread in the apparatus illustrated in FIG. 1.

FIG. 4 like FIG. 1 shows at 17 how the two frames having the slices of bread therein are brought together. To this end, a suitable guideway or like arrangement may be provided. Many different means are known for realizing such an operation, for which reason this guideway is not described in detail. FIG. 4 also shows how the conveyor 10 can have longitudinal upstanding marginal edges or rails 32 by means of which each horizontal lower frame 11 is mounted, as illustrated at 33. After the frames 11, 12 have been brought together they are moved to the pressing means 17 which comprises a wheel 34 from the periphery of which stems 35 project radially. The stems 35 at their free ends have a press plate 36 which will be described more in detail with reference to FIG. 5. The angular distance between the stems 35 and the press plates 36, respectively, is such that the press plates 36 are moved down in sequence into the frames 12 successively advanced on the conveyor 10.

Figure 5:
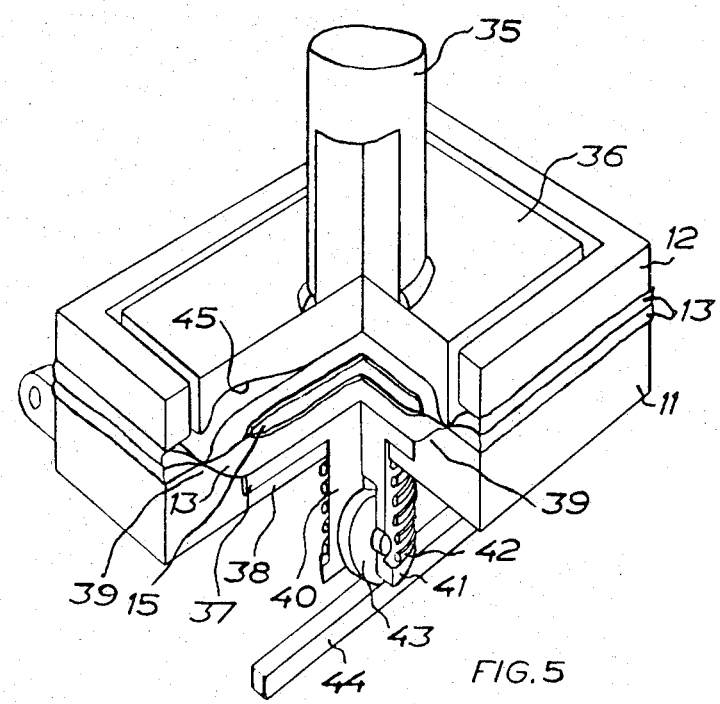
FIG. 5 is a detailed perspective view of frame means for accommodating the slices of bread.

As will appear from FIG. 5, the lower frame 11 is provided with a plate 37 which, as will appear from the following, constitutes an ejecting plate. This plate 37 rests on an abutment 38 which extends all around the opening in the frame 11 and is at a lower level than the upper side of the frame 11. At some distance from its outer periphery the frame 11 is bevelled towards the inner periphery down to the level of the plate 37, as shown at 39. The bevel 39 is flush with the upper side of the frame 11. The plate 37 is connected to a central stem 40 which extends down from the frame and has an end flange 41. Interposed between said flange 41 and the underside of the frame 11 is a coil spring 42 which thus keeps the plate 37 engaged with the abutment 38 of the frame 11. The stem 40 at its lower end has a roller 43 which is adapted to roll on a guideway 44. The upper frame 12 has only so large a width as to cover the planar or non-bevelled portion of the lower frame 11, which portion is situated close to the outer periphery. The press plate 36, as appears both from FIG. 4 and from FIG. 5, has a recess 45 which extends substantially over the entire downwardly facing surface of the plate 36 and which at the outer periphery of said plate 36 closely joins the latter. The recess 45 corresponds in size and shape to the recess in the lower frame 11, which is defined by the bevel 39 and the plate 37. Owing to the bevel 39 and the corresponding portion of the recess 45, the compression pressure exerted by means of the press plate 36 will successively increase towards the outer edges of the slice of bread and will become so high at the periphery of the recesses formed in the lower frame 11 and the press plate 36 that the outermost edges of the two superimposed slices of bread are squeezed off. Because the press plates 36 are mounted in the manner shown in FIG. 4 their longitudinal edges are arcuate so that the press plates will perform a rolling movement down into the opening of the upper frame 12 in the pressing operation.

After a press plate has performed its function and been removed from the upper frame 12 the roller 43 rolls onto a portion of the guideway 44, which is bent towards the frame 11, whereby the stem 40 is moved upwards against the action of the spring 42. To prevent the entire frame assembly from being raised the rails or edges 32 will then suitably be moved beneath arcuately bent holders 46. At the upward movement of the stem 40 the ejecting plate 37 is, of course, urged upwards, whereby the bonded slices of bread are ejected from the frame assembly and caught by a suitable conveying belt 47. Then the frame assembly is moved on by means of the conveyor 10 in order to be opened at 48, whereby the remaining bread rests 49 are removed.

It is readily understood that the apparatus described in the foregoing can be modified in many respects and the invention must not therefore be considered restricted to the very apparatus described. Likewise, the bread may be of any kind that will provide a bonding effect when subjected to pressure, and the filling may consist of any suitable material that need not necessarily be extrudable as other application devices also are conceivable.

What I claim and desire to secure by Letters Patent is:

1. An apparatus for making a food unit consisting of two superimposed slices of bread and a filling interleaved with the slices, said apparatus comprising means for supplying slices by which means the slices of bread are conveyed to means in which a filling is placed on one slice of bread and the other slice of bread is superimposed on the first slice, wherein the conveying means comprises successively advanced pairs of frame having approximately the same dimension as the slices of bread and being adapted each to accommodate one slide of bread, one frame in each pair of such frames being approximately horizontally oriented while the other frame is pivotally connected to the first frame and takes a sufficiently raised position when it moves past the filling means to permit spreading a filling over the horizontal slice of bread while leaving a zone free of filling along the edges of the slice, said frames being adapted to be brought together after they have passed the filling means, and pressing means is provided to exert pressure against the edge zones of the bread slices located between said frames.

2. An apparatus as claimed in claim 1, wherein said frames have open central portions and wherein the pressing means is in the form of press plates which are movable into engagement with the slices of bread located between the frames through the respective open central portions of said frames.

3. An apparatus as claimed in claim 1, wherein the press plate of the horizontal frame rests on an abutment projecting from the inner peripheral edge of said frame, and is at a lower level than the upper boundary plane of said frame, the upper side of said horizontal frame at some distance from the outer periphery thereof is bevelled towards the inner periphery to the level of said press plate in order to form a recess which is defined by the bevel and said press plate, and the press plate of the pivotally mounted frame has in its side facing the recess in the horizontal frame a conforming recess and is insertable in the associated pivotally mounted frame under suitable pressure for bonding the slices of bread while the press plate of the horizontal frame can be moved upwards by suitable means into the space between the frames to serve as an ejecting plate after the press plate of the pivotally mounted frame has been removed.

4. An apparatus as claimed in claim 3, wherein the press plate of the pivotally mounted frame is adapted to revolve about an axis of rotation extending at right angles to the direction of motion of the frames, and said press plate of the pivotally mounted frame is arcuate on the side facing the frames so that when said press plate is introduced into the pivotally mounted frame the interengagement of the slices of bread is effected by a rolling movement from one end of said slices to the other end thereof (FIGS. 1 and 4), and the press plate of the horizontal frame is planar and movable at right angles to the plane of the frames.

5. An apparatus as claimed in anyone of claims 1, wherein a flat tubular nozzle is arranged for the supply of the filling, the width of said nozzle being smaller than the width of the slices of bread.

6. An apparatus as claimed in claim 5, in which the filling is butter or like substance and a further foodstuff, such as jam, wherein the further foodstuff is suppliable through said nozzle while a second flat tubular nozzle is provided for the supply of the butter etc., said second nozzle coaxially surrounding the first nozzle and terminating in the same plane as said first nozzle, and means for supplying foodstuff to the nozzles.

7. An apparatus as claimed in claim 6, wherein means for cutting off the desired length of filling is arranged in front of the mouths of the two nozzles.

* * * * *